United States Patent Office 2,819,295
Patented Jan. 7, 1958

2,819,295
ALKALINE BARK EXTRACTION AND PRODUCT

Franklin W. Herrick and Louis H. Bock, Shelton, Wash., assignors to Rayonier Incorporated, Shelton, Wash., a corporation of Delaware No Drawing. Application October 11, 1955
Serial No. 539,933

7 Claims. (Cl. 260—473.6)

This invention relates to chemicals derived from the bark of coniferous trees and has for its object the provision of an improved product derived from bark, and a process of producing the product. In accordance with our invention, we react an aqueous ammonia extract of coniferous bark with sodium hydroxide and produce a sodium substituted bark derivative which is the product of our invention.

We are aware of the preparation of alkali-bark derivatives, specifically sodium bark derivatives, by digesting various coniferous barks with aqueous alkaline solutions, for example, solutions of sodium hydroxide. Such sodium-bark derivatives are less reactive chemically and are produced in an entirely different manner than the sodium substituted bark derivatives of this invention. Our sodium substituted bark derivatives comprise a different fraction of the organic chemicals of the bark, and are further characterized by retained or combined nitrogen, i. e., nitrogen which is not liberated as ammonia on addition of alkali metal hydroxide.

In the copending patent application of John Charles Steinberg and Kenneth Russell Gray, Serial No. 535,300, filed September 19, 1955, an ammonia bark extract and a process for its production are described and claimed, and this invention is based on our discovery that the ammonia extracts of said application can be reacted with sodium hydroxide to produce sodium substituted bark derivatives having unusual properties. Some of the unusual properties are exemplified by the reaction of the derivatives with polymethylol phenols in the formation of phenol-formaldehyde resins as described and claimed in our copending patent application, Serial No. 539,011, filed October 6, 1955, now abandoned.

The bark of western hemlock (Tsuga heterophylla), and other coniferous trees contain as major phenolic constituents phlobatannins which are considered to be polymers of catechins or of other polyhydroxy aromatic material, a relatively water-insoluble polyhydroxy aromatic material resembling phlobatannins but which probably have higher molecular weights and are known as phlobaphenes, and phenolic acids, as well as an aromatic polymer high in methoxyl but relatively low in phenolic hydroxyl content, resembling wood lignin. Under the conditions of the ammonia extraction, however, very little of the highly methoxylated material will be extracted.

As described more fully in the said Steinberg and Gray patent application, any suitable coniferous bark, may be digested with aqueous ammonia to produce extracts which may be reacted with sodium hydroxide to produce our sodium substituted bark derivatives. Species which have been found suitable include, western hemlock (Tsuga heterophylla), Douglas fir (Pseudotsuga menziesii), Sitka spruce (Picea sitchensis), white fir (Abies amabilis) and southern yellow pine (Pinus echinata, Pinus palustris, Pinus taeda, Pinus caribaea, Pinus elliotti and Pinus rigida var. serotina). In general, coniferous trees are suitable but deciduous trees are not.

The barks of different species of trees differ very greatly in their content of alkali-reactive material, presumably containing phenolic groups, which are reactive with formaldehyde. The following tests have been devised to measure the formaldehyde reactivity of the bark derivatives of various trees and duplicate tests were run to compare the reactivity of bark extracts obtained by digesting the bark with sodium hydroxide solutions and aqueous ammonia solutions.

In a 500 ml. beaker, an accurately weighed sample (about 20 g.) of the bark derivative and approximately 300 ml. of water are well mixed. The pH of the solution is adjusted to 9.5 by adding dropwise 5–10% sodium hydroxide or hydrochloric acid as required. The solution is then washed into a 500 ml. volumetric flask and 25 ml. of 37% formaldehyde is added, water is then added to make 500 ml.

A blank determination is made by adding 25 ml. of 37% formaldehyde to a 500 ml. volumetric flask and diluting to volume with water. Five ml. of this solution is added to 50 ml. of water and 10 ml. of 10% sodium sulfite solution. This solution is titrated to pH 9.5 with 0.1 N hydrochloric acid. The reaction is as follows:

$$CH_2O + Na_2SO_3 + H_2O \rightarrow CH_2O \cdot HSO_3 + NaOH$$

From this titration is calculated the initial formaldehyde concentration.

After four hours, a 5 ml. sample of the original solution is withdrawn, diluted with 50 ml. of water and adjusted to pH 7 with 0.1 N hydrochloric acid. To this solution is added 10 ml. of 10% sodium sulfite and it is then titrated with 0.1 N hydrochloric acid to pH 9.5. From this value is calculated the amount of formaldehyde remaining after four hours.

The formaldehyde which has condensed with the bark is determined by subtracting the formaldehyde found in the four hour sample from that found in the blank. This is expressed as grams of formaldehyde per 100 g. of dry, ash-free bark material.

The above method of determining formaldehyde was described by Lemme, Chem. Ztg. 27, 896 (1903).

The ammonia extracts have approximately the same formaldehyde reactivity as the sodium hydroxide extracts. Since $NH_3$ has a formaldehyde reactivity by this test, a correction has been made for the free $NH_3$ present in the extract. This correction is as follows:

$$\text{Percent } CH_2O = \frac{30 \times 1.5x}{14} = 3.21x$$

where $x$=percent non-combined nitrogen. This value is subtracted from the value obtained by the foregoing procedure. The following table lists formaldehyde reactivities of representative bark derivative extracts made with aqueous solutions of sodium hydroxide and ammonia and measured by the foregoing test.

| Species | Formaldehyde Reactivities | |
|---|---|---|
| | NaOH Extract | NH₃ Extract |
| Western hemlock | 8.4 | 7.4 |
| Douglas fir | 6.4 | 6.6 |
| Sitka spruce | 6.0 | 7.4 |
| White fir | 6.6 | 5.3 |
| Southern yellow pine | 6.0 | 7.5 |

We find any of the bark extracts having a reactivity of at least 5%, according to the foregoing testing method, to be particularly useful.

The bark from trees is usually obtained in large pieces which, for the purpose of digestion in the process, should be comminuted to aid penetration of the reacting ammoniacal solution. The particle size is not critical, but is preferably subdivided so that the bulk of the material will pass through a screen of about 4 meshes to the inch and be retained by a screen of about 20 meshes to the inch. Suitable subdivision may be accomplished by conventional means as by a hammermill or attrition mill.

In carrying out a process of the invention, the coniferous bark in a suitable state of subdivision is digested in an aqueous ammonia solution containing from 0.2% to 29% ammonia ($NH_3$) and in an amount varying from 0.02 to 1.5 pounds of $NH_3$ per pound of bone dry bark, at a temperature of from 17° to 170° C. for from 15 to 240 minutes. In the preferred and most advantageous operating conditions from a consideration of quality yield and the economical use of ammonia, it is advantageous to use from 0.1 to 0.25 pound of $NH_3$ per pound of bone dry bark, at a temperature of from 97° to 170° C., specifically in the neighborhood of 150° C. and for from 30 to 40 minutes.

At the higher temperatures of the range, the shorter reaction time and lower chemical to bark ratios would be used. At the low temperatures of the range, high ammonia to bark ratios and longer reaction times would be used. Variations in the process conditions will effect some difference in the content of organically combined nitrogen and phenolic hydroxyl.

In the preferred embodiment of the ammonia extraction process, excess ammonia is usually employed and in this respect it differs from the caustic soda extraction process where, to achieve selectivity in extraction, the NaOH is limited to less than that which will react with the bark substance.

The subdivided bark is charged into a reaction digester to form a reaction mixture comprising about 10% to about 20% of bark based on its equivalent oven-dry weight and a suitably concentrated aqueous ammoniacal solution in the ratios of ammonia to bark aforementioned. In general, it is desirable, but not essential, to agitate the charge in the digester, although continuous mixing reduces somewhat the time of reaction. In any event, the digestion equipment and physical condition of the bark must be capable of bringing the bark material and water solution of ammonia into intimate contact. The reaction is preferably conducted in a closed pressure vessel. The digestion may be carried out either continuously or batchwise in a single stage or in a multiplicity of stages.

Following the digestion, the ammonia bark extracts are obtained in the most practical manner as well as in the highest yield and least dilution by expressing them from the treated bark by pressing, which separates from the solid, residual portion of the bark a solution comprising both soluble material which could readily be separated from the residual bark by draining as well as high molecular weight soluble material which, in view of very low diffusion rates, could be removed from the bark only by lengthy and excessive washing if the digested bark were merely lixiviated as, for example, on a filter. Lixiviation, or filtration followed by lixiviation, while considerably less efficient than expressing (in regard to time required and dilution of the product solution) may, however, be used. The extract solution usually contains a small amount of insoluble material such as bark in fine subdivision which may or may not be removed as desired.

In digesting western hemlock bark with aqueous ammonia with ratios of $NH_3$ to dry bark of from 0.027 to 0.40, at temperatures varying from 30° to 170° C. for times varying from 30 to 240 minutes, bark extracts can be produced containing from 2.4% to 5.3% of total nitrogen and from 0.6 to 3.5% of combined nitrogen. Not only does the ammonia extraction process result in a bark extract containing nitrogen but it results in a more uniform chemical product than can be extracted by digesting the bark with sodium hydroxide solutions.

The following example illustratees the preparation of a sodium substituted bark derivative according to our invention:

*Example*

Western hemlock bark was hogged to sizes not larger than that which will pass a screen of about 2 meshes to the inch. An autoclave equipped with mechanical agitator was charged with a quantity of the hogged bark corresponding to 100 parts of dry bark, aqueous ammonia corresponding to 10 parts of anhydrous ammonia and water to make a total charge of 670 parts. The autoclave was heated rapidly to 150° C. and held at that temperature with agitation for 30 minutes. The reaction mixture was then discharged and pressed through a 200 mesh screen to remove solid particles. The extract was analyzed and found to contain 26.4 parts of dissolved solids. 5.28 parts in solution of sodium hydroxide was then added (corresponding to 20% the weight of dry solids) and the solution was vacuum concentrated to 25% solids. The solution was then spray-dried to form a fine, dark colored, free-flowing powder. The gross yield was 31.7 parts. The proportion of sodium hydroxide to bark extract solids is not critical except as it applies to the properties of resin made from the extract. The ratio of sodium hydroxide to bark extract solid may be varied from 5 to 25%.

As described more fully in the said application of Steinberg and Gray, Serial No. 535,300, the variations in the time, temperature and ratios of ammonia to dry bark have some effect on the yield and character of the ammonia extract as illustrated with reference to the digestion of western hemlock bark. In digesting for 30 minutes at 150° C. with from 0.02 to 0.4 part of $NH_3$ per part of bark, the yield varied from 20.3 to 38.6%, the total nitrogen from 2.8 to 4.4% and the combined nitrogen from 0.9% to 3.4%.

We claim:

1. The sodium substituted bark derivative obtained by reacting an aqueous ammonia extract of coniferous tree bark containing appreciable quantities of phlobatannins, phlobaphenes, and an aromatic polymer high in methoxyl with sodium hydroxide in aqueous solution containing from 5% to 25% by weight of sodium hydroxide per part of bark extract solid, said ammonia extract having been prepared by digesting the bark in aqueous solution containing from 0.02 to 1.5 parts of ammonia per part of dry bark at a temperature of from 17° to 170° C. for from 15 to 240 minutes and separating the extract from the bark residue, said sodium substituted bark derivative being characterized by containing combined nitrogen.

2. The sodium substituted bark derivative of claim 1 obtained by digesting a coniferous bark with aqueous ammonia containing at least 0.1 part of ammonia per part of dry bark at a temperature of at least 97° C. for from 30 to 40 minutes.

3. The sodium bark derivative of claim 1 which comprises from 0.6% to 3.5% of combined nitrogen.

4. The process of producing a sodium substituted bark derivative which comprises reacting an aqueous ammonia extract of coniferous tree bark prepared by digesting the bark with from 0.1 to 0.4 part of ammonia per part of dry bark with from 5% to 25% of sodium hydroxide in aqueous solution per part of solid ammonia extract and forming the sodium substituted bark derivative.

5. The process of producing a sodium substituted bark derivative which comprises digesting coniferous bark in a state of subdivision with an aqueous ammonia solution containing from 0.02 to 1.5 part of $NH_3$ per part of dry bark at from 17° to 170° C. for from 15 to 240 minutes and forming an aqueous extract containing from 2.4% to 5.3% of total nitrogen and from 0.6 to 3.5% of combined nitrogen, and reacting the extract in aqueous solution with a sufficient amount of sodium hydroxide to displace the ammonia and produce the sodium substituted bark derivative.

6. The process of producing a sodium substituted bark derivative which comprises digesting coniferous bark in an aqueous ammonia solution containing from 0.02 to 1.5 part of $NH_3$ per part of dry bark at a temperature of from 17° to 170° C. for from 15 to 240 minutes forming an extract containing from 0.6 to 3.5% of combined nitrogen, reacting the ammonia extract in aqueous solution with sufficient sodium hydroxide to displace the ammonia and form the sodium substituted bark derivative, and heating the solution containing the sodium substituted bark derivative to remove the substituted ammonia.

7. In the process of claim 6, evaporating the solution containing the sodium substituted bark derivative under a vacuum to remove the substituted ammonia and concentrate the solution.

References Cited in the file of this patent

UNITED STATES PATENTS

| | | |
|---|---|---|
| 836 | Hayes | July 12, 1838 |
| 509,703 | Taylor | Nov. 28, 1893 |
| 2,676,980 | Tu | Apr. 27, 1954 |

FOREIGN PATENTS

| | | |
|---|---|---|
| 2,668 | Great Britain | 1854 |

UNITED STATES PATENT OFFICE
Certificate of Correction

January 7, 1958

Patent No. 2,819,295

Franklin W. Herrick et al.

It is hereby certified that error appears in the printed specification of the above numbered patent requiring correction and that the said Letters Patent should read as corrected below.

Column 2, line 25, should appear as shown below instead of as in the patent:

Signed and sealed this 11th day of March 1958.

[SEAL]

Attest:
KARL H. AXLINE,
*Attesting Officer.*

ROBERT C. WATSON,
*Commissioner of Patents.*